(12) United States Patent
Kornmann

(10) Patent No.: US 7,844,912 B2
(45) Date of Patent: Nov. 30, 2010

(54) SYSTEM AND METHOD USING TRANSFORMATION NODES WITH ENHANCEMENT LAYERS

(75) Inventor: Tim Kornmann, Wiesloch (DE)

(73) Assignee: SAP AG, Walldorf (DE)

( * ) Notice: Subject to any disclaimer, the term of this patent is extended or adjusted under 35 U.S.C. 154(b) by 1012 days.

(21) Appl. No.: 11/615,589

(22) Filed: Dec. 22, 2006

(65) Prior Publication Data

US 2008/0155523 A1 Jun. 26, 2008

(51) Int. Cl.
*G06F 3/048* (2006.01)
(52) U.S. Cl. .................. 715/764; 715/200; 709/201
(58) Field of Classification Search .................. 717/168
See application file for complete search history.

(56) References Cited

U.S. PATENT DOCUMENTS

| 7,424,485 B2 * | 9/2008 | Kristiansen et al. ......... 707/102 |
| 7,657,868 B2 * | 2/2010 | Shenfield et al. ............ 717/107 |
| 2007/0033088 A1 * | 2/2007 | Aigner et al. .................. 705/9 |

\* cited by examiner

*Primary Examiner*—Ulka Chauhan
*Assistant Examiner*—Donna J Ricks
(74) *Attorney, Agent, or Firm*—Kenyon & Kenyon LLP

(57) ABSTRACT

Methods and systems to include transformation nodes in a business system are provided. A transformation node may provide controlled redundancy of data within the business object hierarchy. Transformation nodes may store data from core nodes without persistency, and permit different data presentation modes than for the core nodes. When a service call is placed to a transformation node, the transformation node may call corresponding services from associated core nodes.

11 Claims, 10 Drawing Sheets

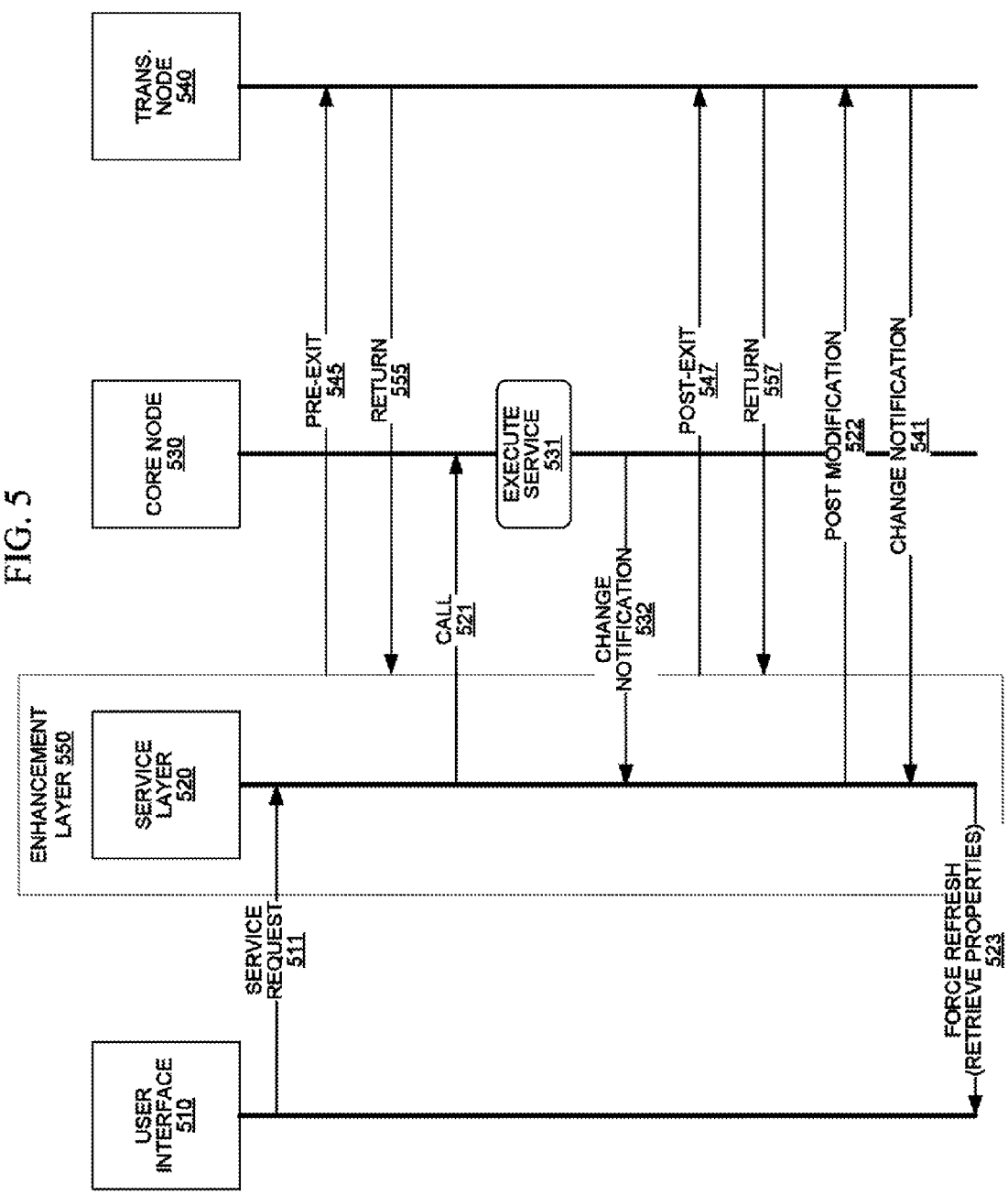

SYSTEM AND METHOD USING TRANSFORMATION NODES WITH ENHANCEMENT LAYERS

BACKGROUND

Computer-based business systems often contain many business objects to store data and program instructions on a machine-readable hardware storage medium for execution on at least one processor and perform business functions. Each business object may expose one or more services to a user interface, such as services to create or update entities managed by the business object. For example, a business object for storing and manipulating purchase orders may expose services allowing for the creation of new purchase orders, modification of previously-created purchase orders, and other similar functions. The services exposed by a business object may be represented as a hierarchy of nodes.

Business objects are designed to be redundancy-free so that specific content, such as an address, telephone number, etc., only occurs once in the business object. A user interface can discover the services available from various business objects and applications by querying a service layer. The service layer interacts with business objects to identify what services are available for each business object, and returns information about the services to the user interface. Model-driven user interfaces therefore do not include functionality coded therein; instead, all functionality in the user interface is derived from the service layer and business objects. When a service is invoked via the user interface, service providers in the backend applications implement the appropriate service.

Although this structure permits the user interface to reflect the structure of each business object, it does not allow for structural differences between the user interface and the backend database or business object. That is, since the user interface renders data only as presented by the business object, it does not allow for variations in the presentation of data and services. For example, model-driven interfaces generally are unable to display the same data in multiple formats, and it may be difficult to present highly-sophisticated user interfaces since the rendered data must be directly related to the services exposed by each business object. In some circumstances it also may be desirable to perform operations that are not explicitly defined by a core element of a business object before or after activation of an associated user interface element.

BRIEF DESCRIPTION OF THE DRAWINGS

FIG. 5 shows a process for executing a service in a system implementing transformation nodes according to an embodiment of the present invention.

DETAILED DESCRIPTION

The present invention provides systems and methods to include "transformation nodes" in a business system. A transformation node may provide controlled redundancy of data within the business object hierarchy. Transformation nodes may be flagged or otherwise designated in the business object to distinguish them from "core nodes." Core nodes store data elements and functions on which the business processes rely. Transformation nodes may store data from core nodes without persistency, and permit different data presentation modes than for the core nodes. A transformation node may also have associated services in the backend application. However, when a service is invoked, the service for the transformation node may call corresponding services from associated core nodes, which perform the requested operations.

In some applications, it may be desirable to have a certain amount of redundancy in the user interface. For example, it may be useful to provide alternate interfaces for a user to enter the same data, such as a date or date range. In a standard model-driven user interface, the user is only presented with fields corresponding to database entries. A transformation node may allow this sort of redundancy in the user interface, without requiring corresponding redundancy in the backend databases or business objects. For example, where the same information is to be displayed in multiple ways in the user interface, the information can be displayed using transformation nodes instead of being stored in multiple forms and later displayed via a standard model-driven user interface.

Transformation nodes may avoid inconsistencies in the user interface or stored data that could result from this controlled redundancy by synchronizing the various redundant interfaces created by the transformation nodes. The same data and services may be displayed simultaneously on multiple user interfaces. When data is updated or a service called in one interface, the transformation nodes are notified. The transformation nodes can then send notifications to other user interfaces displaying the same data and/or services, instigating a refresh of the information displayed in each interface. Information therefore may be consistently displayed across all appropriate user interfaces.

In an embodiment, service requests may be made via core nodes or transformation nodes. For example, a user interface might include an element that exposes a service of a core node, and an element that exposes a service of a transformation node. When a user generates a request using a user interface element, the request is sent to the node associated with the interface element used to generate the request.

Figure 1:
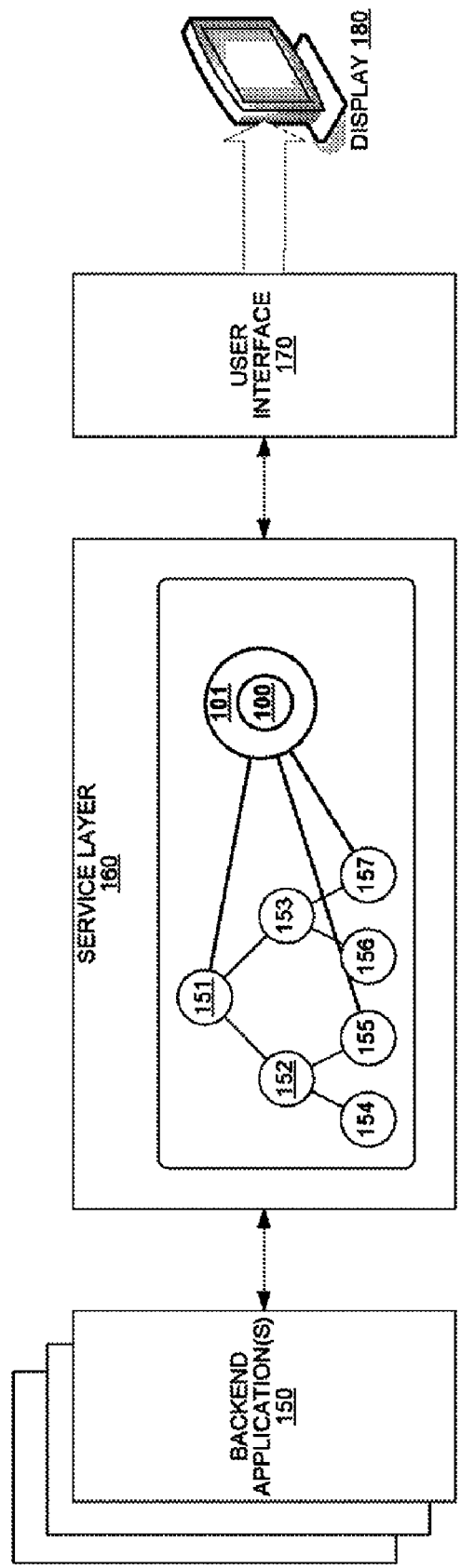
FIG. 1 shows a business system and user interface implementing transformation nodes according to an embodiment of the present invention.

FIG. 1 shows a business system and user interface implementing transformation nodes according to an embodiment of the present invention. One or more backend applications 150 are present in the business system. The applications may be stored and executed on one or more servers in communication with a user interface 170 displayed on a terminal or other display 180. Various network topologies and protocols may be used to enable communication between the business system and the user interface. The specific arrangement and topology of servers, applications, systems, communication protocols, and connections are irrelevant to the present discussion unless specified otherwise herein.

The user interface 170 may access the backend applications 150 via a service layer 160. Each business object in the system may be associated with one or more services, represented in FIG. 1 as a hierarchy of core nodes 151-157. Each core node 151-157 represents a single service exposed by the business object. In an embodiment, services are only executed by the core nodes and related service providers.

A transformation node 100 may present different services and user interface functionality than the core nodes 151-157. The services and functionality exposed by the transformation node 100 are based on and associated with services exposed by specific core nodes 151, 155, 157. When the transformation node 100 receives a request to a service implemented by the transformation node, the request is translated and/or redirected to the appropriate services implemented by the core nodes 151, 155, 157. The transformation node 100 may be embedded in or otherwise include an enhancement layer 101. The enhancement layer 101 may serve as the runtime environment for the transformation node 100. An enhancement layer may augment services exposed by a core node to further support the use of transformation nodes. As described in further detail below, an enhancement layer may perform pre- and post-exit operations. The pre- and post-exit operations may invoke logic within a transformation node, which may then redirect service calls to the related core nodes 151, 155, 157.

Figure 2A:
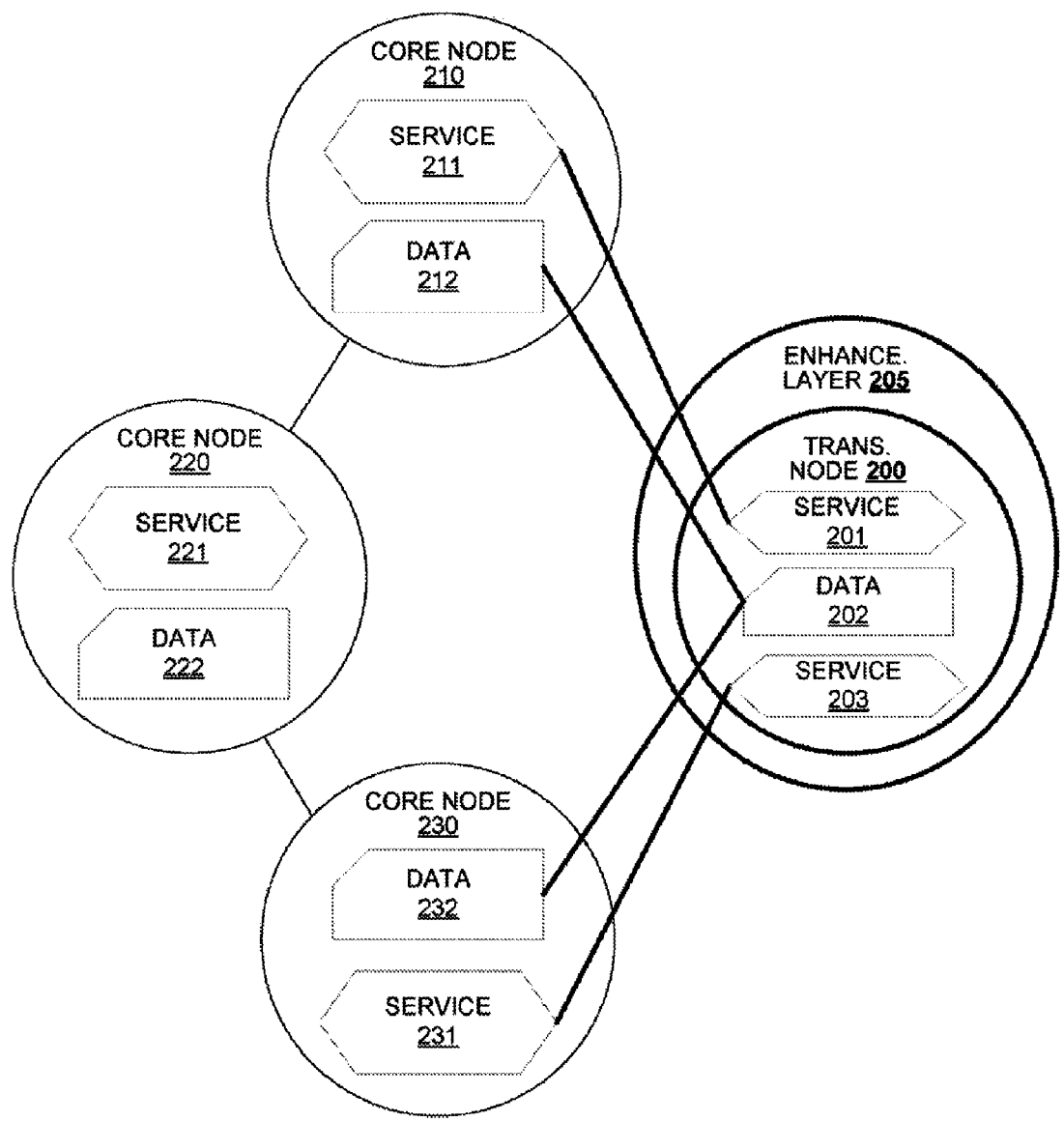
FIG. 2A shows core nodes and a transformation node according to an embodiment of the present invention.

FIG. 2A illustrates a transformation node 200 that reads data and services from two core nodes 210, 230. A transformation node 200 may not use all the core nodes in the hierarchy. For example, in FIG. 2A the transformation node does not use one of the exemplary core nodes 220. Each core node 210, 220, 230 includes data 212, 222, 232 and services 211, 221, 231, respectively. The transformation node reads data and services from the core nodes. Based on a set of transformation rules stored in the business object, the transformation node 200 compiles the data into a presentation format appropriate for a user interface. The transformation node may offer representations of data and services that are different from those exposed by the core nodes. That is, the transformation node may provide different formats and/or presentation modes than those provided by the core nodes. In the example shown in FIG. 2A, the transformation node 200 includes data 202 and two services 201, 203.

Because a transformation node is a business object node, a user interface need not distinguish between the transformation node and a standard core node. The transformation node can thus expose data and services in a way that can be used by the user interface. Based on the services exposed by the selected core nodes, the transformation node may create services to be exposed to the user interface. These services may be direct "copies" of the original core node services (i.e., data will be passed directly through the transformation node service to the original service). The services may also be "new" services created by the transformation node, that can pass requests on to one or more core node services. The requests may be passed directly, or they may be modified before being passed to the core services. Similarly, the transformation node can select and combine various data stored in the business object. A service exposed by a transformation node may be referred to as a transformation service.

Interface information is provided to the user interface by a transformation node, which allows the user interface to present the data and call the services created in the transformation node. In general, the user interface does not distinguish between the data and services provided by a transformation node and those provided by a core node. The transformation node includes the logic and rules to map between transformation node services and core node services. For example, in FIG. 2A the transformation node 200 exposes services 201, 203 based on or referencing core services 211 and 231 respectively. These services may utilize or display a combination of data 202 derived from data 212, 232 stored in the core nodes. The transformation node 200 may also include or be embedded within an enhancement layer 205. The enhancement layer 205 may redirect transformation node requests to a transformation node before or after a service 201, 203 derived from the core nodes. As explained below, the enhancement layer 205 may provide pre- and post-exits that are triggered before and after operation of a core node service. The pre- and post-exits may enhance a core node's logic and/or data within the transformation node framework.

Figure 2B:
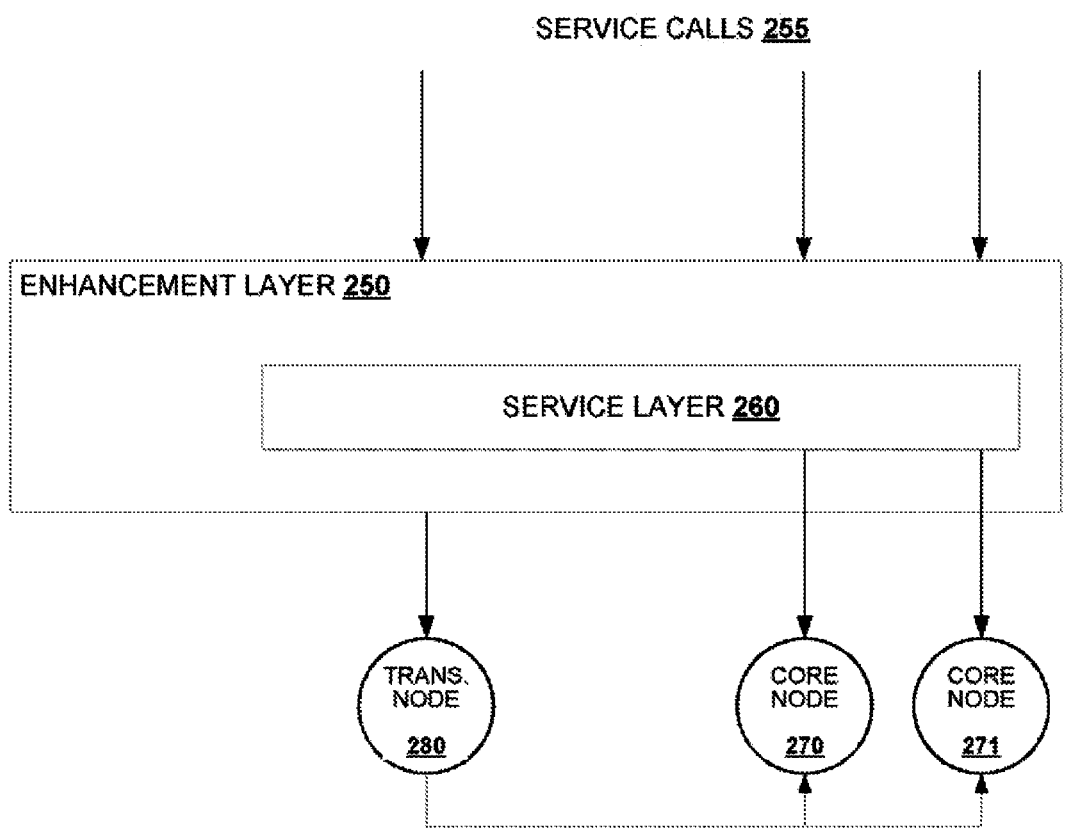
FIG. 2B shows an exemplary system having core nodes, transformation nodes, and an enhancement layer according to an embodiment of the present invention.

FIG. 2B shows an exemplary system having core nodes, transformation nodes, and an enhancement layer according to an embodiment of the present invention. Service calls 255 may be placed received by a service layer 260 embedded in or having an enhancement layer 250. A call to a service provided by a core node 270, 271 may be sent by the service layer 260 to the appropriate core node. If a call requests a service provided by a transformation node 280, the enhancement layer may send the request to the appropriate transformation node. As described below, the enhancement layer may also perform pre- and/or post-exit operations before and after sending the request to the transformation node, respectively. The transformation node can then delegate requests to core nodes implementing the services exposed by the transformation node.

Figure 3:
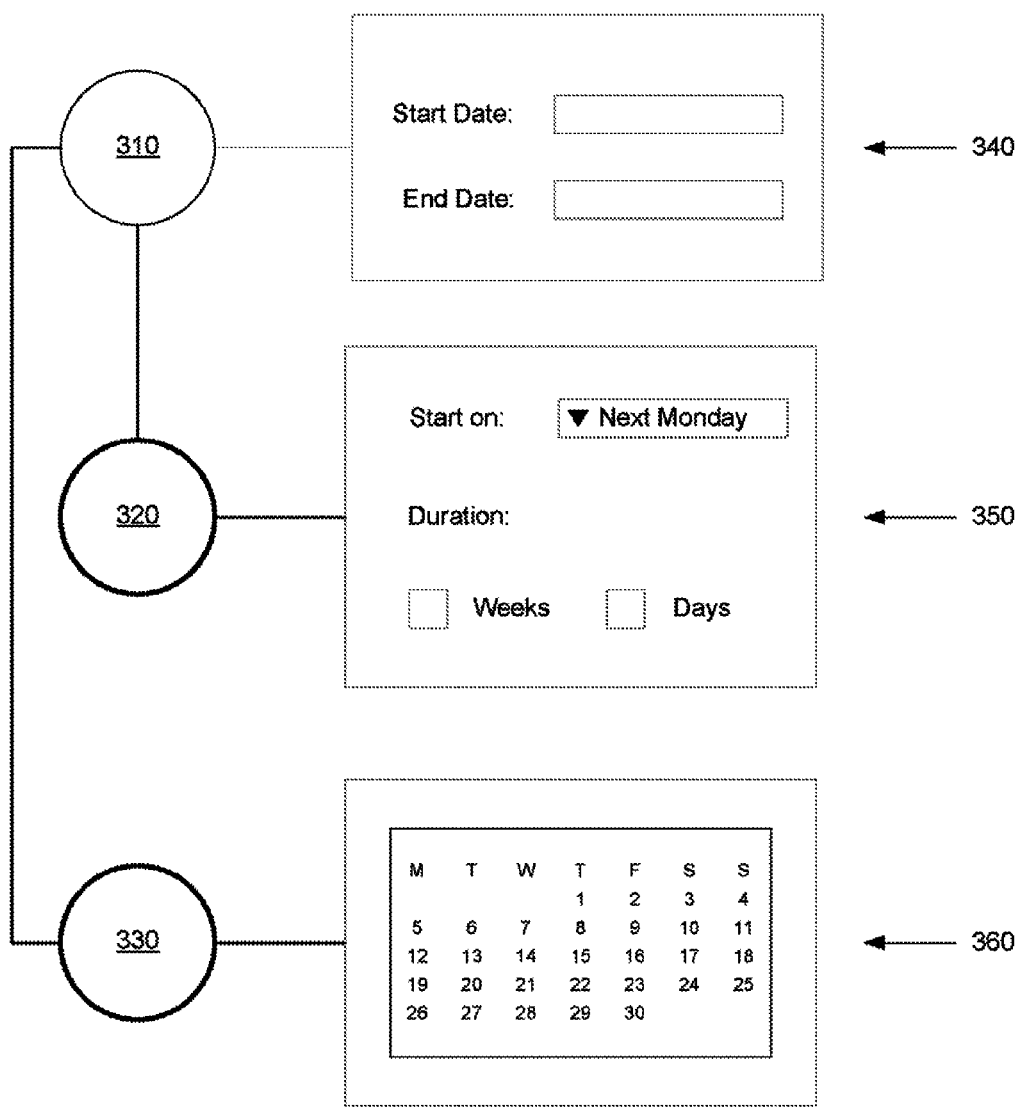
FIG. 3 shows a user interface using a core node and a transformation node according to an embodiment of the present invention.

An example of user interface elements generated from a core node and transformation nodes is shown in FIG. 3. A user interface may include multiple screens 340, 350, 360. The screens may be shown on the same display device, or they may be shown on different displays. In the example shown, each interface may be used by an employee to make a leave request. In one interface 340, the interface is mapped directly from a core node 310. The structure of the interface directly reflects the structure of data stored in the core node 310. That is, since the only information required by the core node to create and process a leave request is the start and end dates, the user is only able to enter the leave request by specifying those two dates. The interface element 340 associated with the core node 310 therefore provides data entry areas for an employee to enter the start and end dates of the leave request.

A second user interface element 350 may be associated with a transformation node 320. The transformation node 320 may retrieve data and services from the appropriate core node 310. An interface element 350 may then be constructed in the user interface based on the services and data provided by the transformation node 320. The element constructed from the transformation node may provide a different presentation mode than the element constructed from the core node. In the example shown, an employee may enter a leave request by selecting the day on which the leave is to begin, such as "Next Monday," "Next Friday," etc., and the duration of the leave in weeks and days. The transformation node 320 includes logic to map between the start and end date values stored in the business object and the values shown in the interface.

Other presentation modes may be used. As another example, a second transformation node 330 allows for a "date selection" calendar 360 to be displayed in the user interface. Thus, instead of typing in the dates of a leave request as required in the core node interface 340 or selecting the leave request times as shown in the first transformation node interface 350, an employee may select the dates from a calendar.

When the interfaces in FIG. 3 are created and/or when a service is activated by a user, pre- and/or post-exit operations may be performed by an enhancement layer of the transformation node. The enhancement layer may redirect requests to a transformation node. For example, prior to creating the interfaces, a pre-exit service may be called to determine which dates should or should not be presented in the interface. Similarly, after a user creates a leave request, a post-exit service may be called to determine whether the leave request includes a valid time period or date. The pre- and post-exit operations may represent operations that are not included in the core node services implemented in the transformation node. In general, the services provided by the enhancement layer will complement or support the core services provided by the transformation node.

As a specific non-limiting example, pre- and post exits can be used within a "Purchase Contract" business object which contains a node "Item Price Specification" that models an item's price conditions. Each instance of such a node may model one price condition such as the base price or a discount amount. This modeled data may be quite complicated, preventing a simple overview from being presented to a user. A transformation node "Current Valid Base Price" may model a view of the price specification node instances. This node can be called as a post-exit operation performed on the price specification node instance. For example, the transformation node instance may directly create an "Item Price Specification." If the transformation node is changed, it can then change the price specification. Similarly, if the price specification is changed it can send change notifications to a service consumer. Within the post exit of the corresponding core change service the transformation node may listen for such a notification and create a change notification to notify the UI about the changes. Without this notification the UI may only load the changed data of the price specification and not the implicitly changed transformation node data.

To prevent data errors and/or redundancy in the business system, the transformation node may provide mechanisms for synchronizing the two interface elements. For example, in the user interface shown in FIG. 3, when a user selects a date in the calendar 340 the appropriate date may be entered in the "Start Date" entry area in the other interface element 330. Each interface may display data derived from data entered by a user in one of the other interfaces. That is, data displayed in one interface 350 may be derived from another interface 340 or 360; similarly, data displayed in the "calendar" interface 360 may be derived from data entered in either of the other interfaces 340 or 350. Specific examples of the processes and communications used to maintain consistency between interface elements are described in more detail below.

Figure 4A:
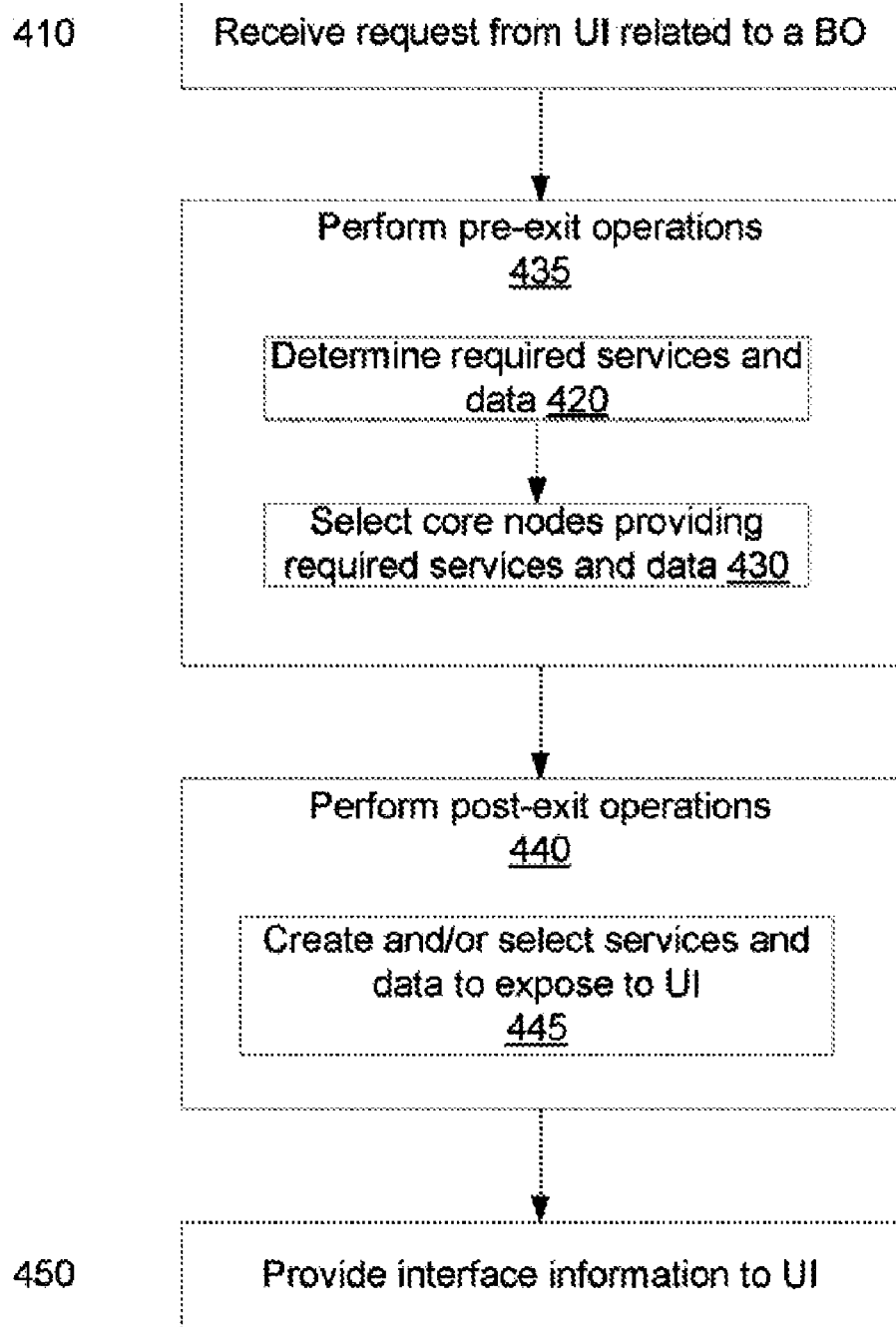
FIG. 4A shows a method used by a transformation node according to an embodiment of the present invention.

The transformation node may act as an intermediary between the core nodes of a business object and the user interface. The transformation node can select various data and services to expose to the user interface based on user input. FIG. 4A shows the basic process a transformation node might use in communication with a user interface. First, the transformation node receives a request 410 from the user interface related to a business object. For example, a user might select a function allowing for a business partner address to be updated. The transformation node then determines the services and data provided by and stored in the related business object that are necessary to complete the user request 420. Core nodes that provide the required data and services may be selected 430. The transformation node operations 420, 430, may be encapsulated in or augmented by an enhancement layer that performs pre-exit operations 435. The transformation node may then create and/or select services and data to expose to the user interface, based on the request received from the user and the services exposed by the selected core nodes 445. The transformation node operations 445 may be encapsulated in or augmented by an enhancement layer that performs post-exit operations 445. Finally, interface information may be provided to the user interface 450.

Figure 4B:
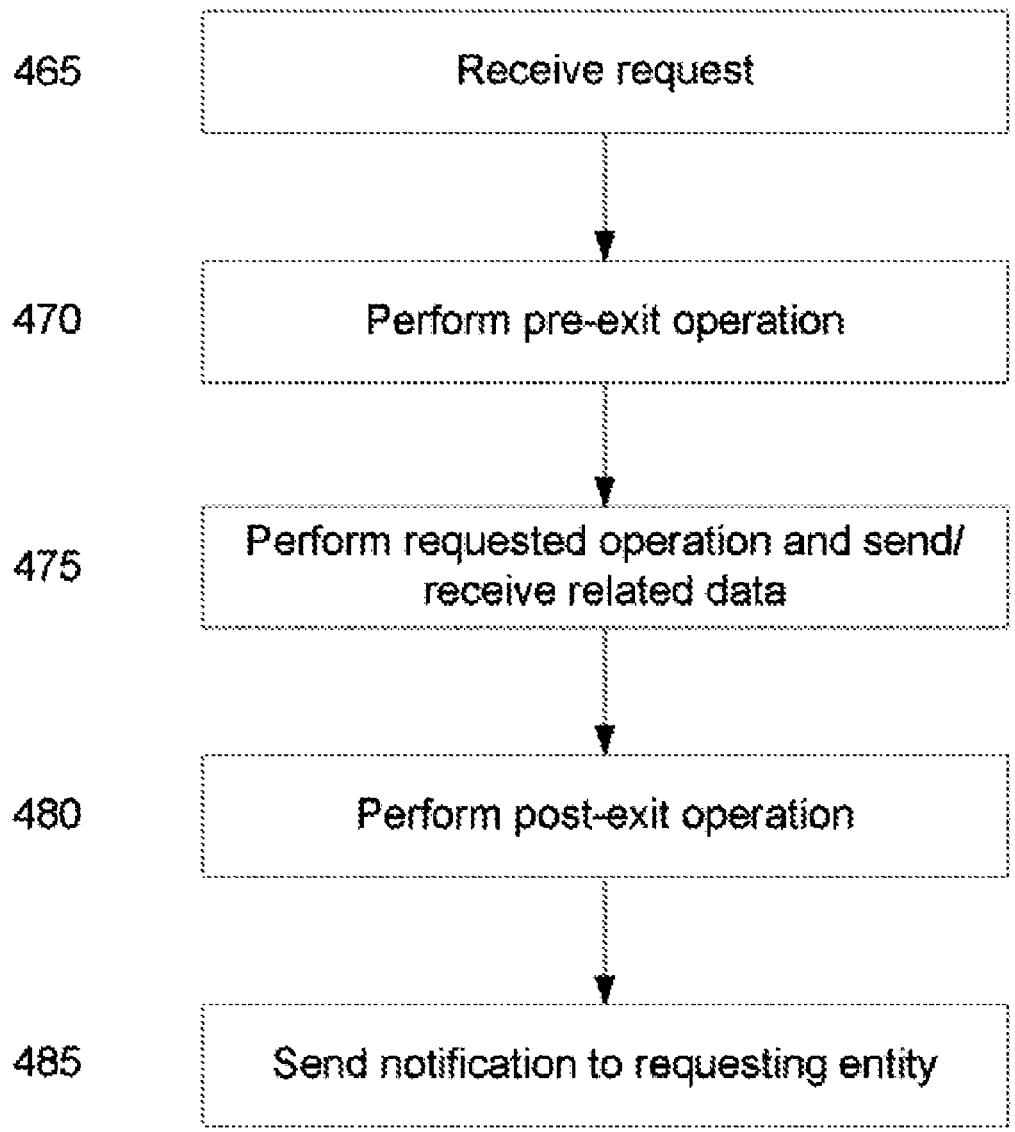
FIG. 4B shows a method using an enhancement layer according to an embodiment of the present invention.

FIG. 4B shows a method using an enhancement layer to process a request received by a transformation node. When a request is received from a user interface 465, a pre-exit operation 470 may be performed. The pre-exit operation may call other services, or it may perform functions built in to the enhancement layer. The transformation node may then perform the requested operation 475. Data associated with the requested operation may be sent and/or received. For example, data resulting from the operation may be returned to the user interface. After the requested operation is performed, a post-exit 480 operation may be performed. The post-exit operation may call other services, or it may perform functions in the enhancement layer. Once the requested operation and any pre- and post-exits have been performed, the transformation layer can send a notification to the requesting entity. For example, if the request was received from a user interface, properties of an interface element may be returned to the user interface. In such an example, the pre- and post-exit operations may provide additional information or implemented changes to the interface information returned to the user interface layer. The enhancement layer may also provide or call a service to determine modification data associated with interface elements to be provided to the user interface. For example, a pre- or post-exit operation may identify user interface data that is obsolete, and remove it from the interface element or replace it with up-to-date data.

FIGS. 5-8 show the basic communications between nodes, the user interface, and a service layer when a transformation node is present. Referring to FIG. 5, a set of communications resulting from a user request via a core node is shown. When a user makes a service request 511 via a user interface 510, the request may be made using an element of the user interface associated with a core node. A service layer 520 may receive the request, and call the appropriate node. If the request is made using a core node interface element, the service layer may call the appropriate core node 530. The core node 530 then executes an appropriate service 531 and sends a change notification 532 to the service layer.

Since transformation nodes may introduce controlled redundancy in a user interface, there may be transformation nodes in the system which should be updated based on the service executed by the core node 530. The service layer 520 may send a notification 522 to each transformation node 540 after a core node executes a service. The transformation node may then identify which core node or nodes have changed. If the transformation node should be updated as a result of the service request, the transformation node may send a change notification 541 to the service layer. Finally, the service layer may notify 523 the user interface of which nodes should be refreshed due to completion of the service request. The user interface can then request updated data from changed nodes. Examples of the user interface refresh process are described in further detail below. An enhancement layer 550 may perform various pre- and post-exit operations 545, 547, respectively. For example, before a call 521 to a core node, a pre-exit operation 545 may be performed by the enhancement layer. The pre-exit operation may result in data being returned 555 to the transformation node. The enhancement layer may also call other services, such as services provided by other core nodes or other service layers (not shown). When a pre- or post-exit operation is performed, data may be returned 555, 557 to the transformation node. In general, the operations performed by the enhancement layer may augment or otherwise be related to the services exposed by the transformation node. The pre- and post-exits shown in FIG. 5 are shown by way of example; it will be understood that pre- and post-exit operations may be performed whenever a core node service is called.

Figure 6:
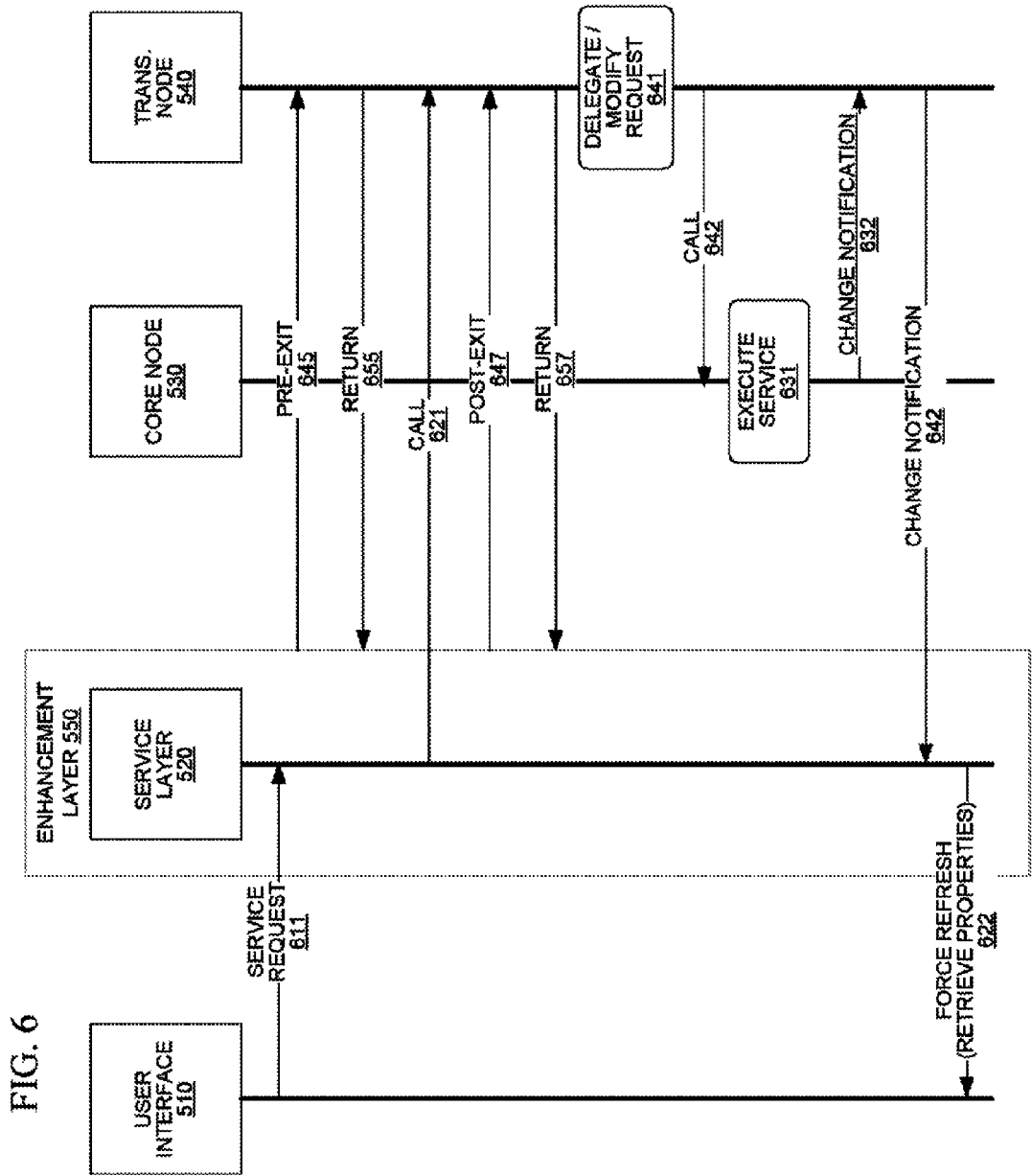
FIG. 6 shows a process for executing a service in a system implementing transformation nodes according to an embodiment of the present invention.

FIG. 6 shows a similar process where the service to be executed is implemented by a transformation node. When the service layer 420 receives a service request 611 based on a service implemented by the transformation node 540, a call 621 may be sent to the transformation node 540. The transformation node may then determine which core node or nodes 530 implement the core services necessary to perform the request. The transformation node may delegate the request to the appropriate core node; the transformation node may modify the request prior to delegation 641. The transformation node then sends appropriate service calls 642 to the core nodes 530. A service call sent to a core node may be a redirection or copy of the original call 621 to the transformation node, or it may be a service call constructed by the transformation node based on the original service request (641). A pre-exit may be performed prior to the call 621 to the transformation node, which may result in data being returned 655 to the enhancement layer. Similarly, a post-exit 647 and resulting return 657 may be performed after the call 621. Pre- and post-exits may be performed at other points in the process, such as relative to the change notification 632 described below.

The core node may execute the service or services requested by the transformation node 631, and return a change notification 632 to the transformation node. In an embodiment, the core node 530 performs the same regardless of whether it receives a request from a service layer or a transformation node 540, and therefore the change notification 632 is returned as if the request had been made by the service layer 520. When it receives change notifications from the core nodes, the transformation node may send a change notification 642 to the service layer. The user interface 510 may then be updated appropriately.

Figure 7:
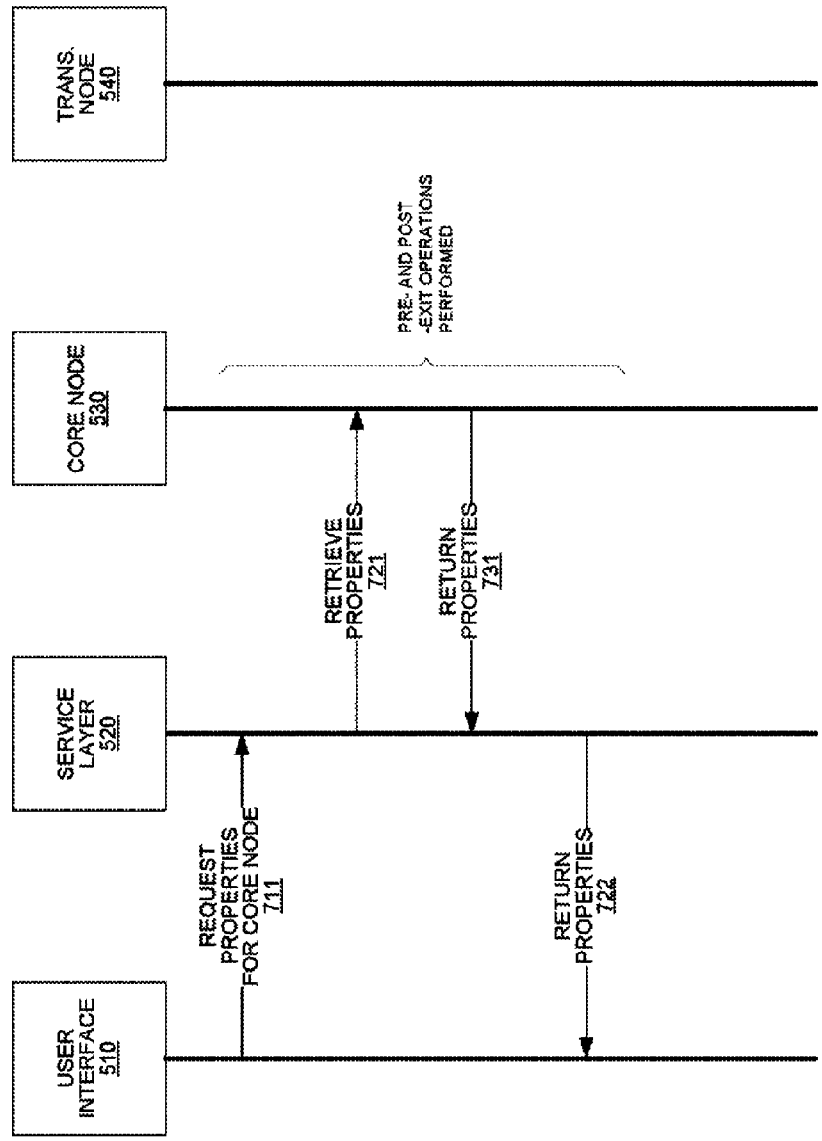
FIG. 7 shows a process for retrieving properties in a system implementing transformation nodes according to an embodiment of the present invention.

Before rendering fields related to services, the user interface must retrieve properties of the fields from the appropriate nodes. The user interface may also retrieve information from nodes to update displayed information after a service has been executed. FIG. 7 shows an exemplary process by which a user interface may retrieve properties from a core node. First the user interface 510 may send a request 711 to the service layer 520. The service layer may determine whether to send the request to a core node 530 or a service node 540. If the request is for properties of a core node 540, the service layer may retrieve properties 721 from the core node. The properties may then be returned 731 to the service layer, and sent from the service layer to the user interface 722. In most cases, no communication between the service layer and transformation nodes will be necessary to retrieve properties of a core node. As previously described, an enhancement layer (not shown) may be used to augment or enhance requests sent to the core node 530. Pre- and post-exits as previously described may be performed during the operation of the services exposed by the core node.

Figure 8:
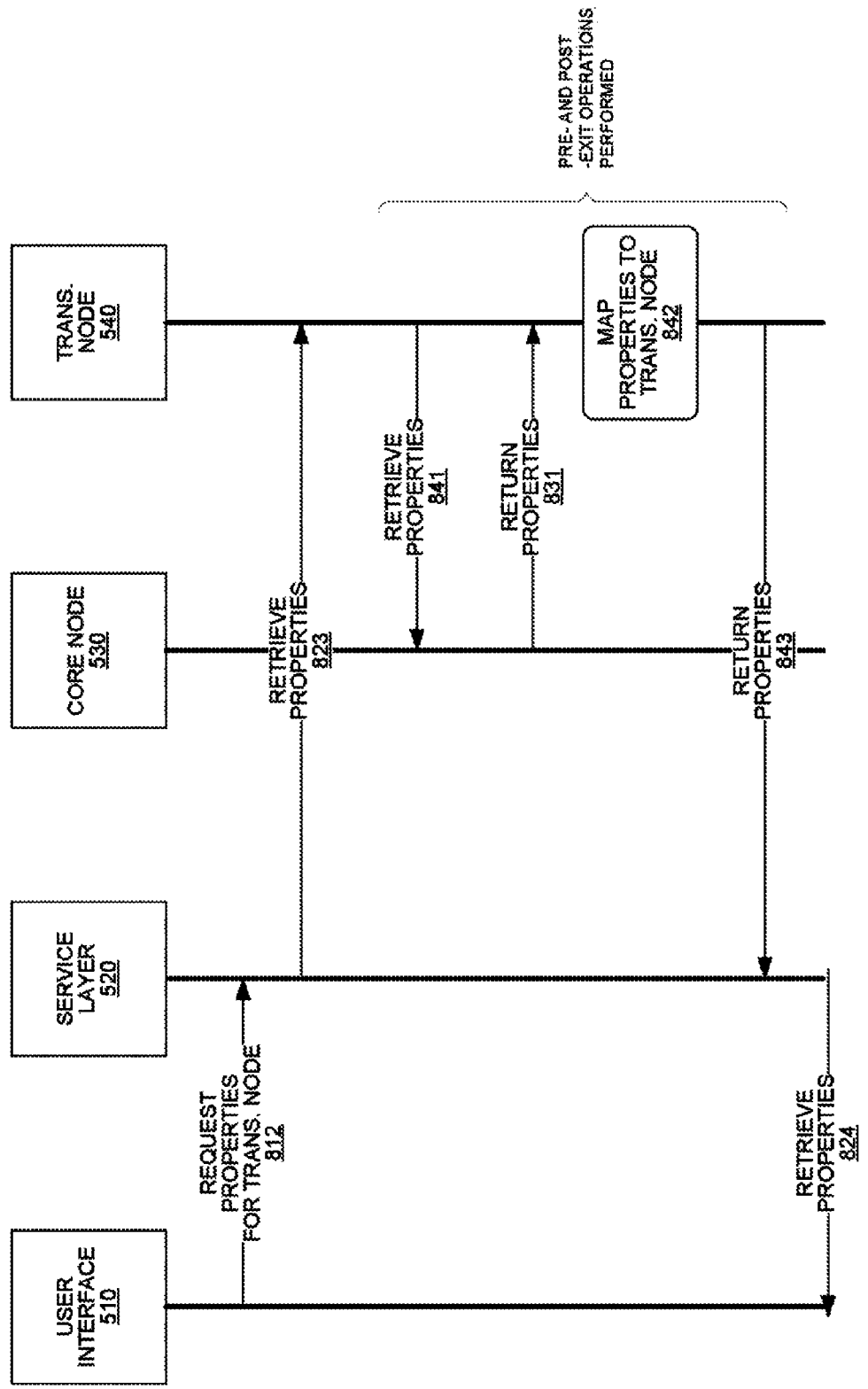
FIG. 8 shows a process for retrieving properties in a system implementing transformation nodes according to an embodiment of the present invention.

To retrieve properties of fields from a transformation node a similar process may be used, as shown in FIG. 8. When a user interface sends a request 812 to the service layer 520, the service layer may send a request 823 to retrieve properties from the appropriate transformation node 540. To maintain consistency among core nodes and transformation nodes, the transformation node may then request 641 and receive 631 related properties of any core nodes on which the transformation node depends. The request 641 sent by the transformation node may be the same as the request that the service layer sends when requesting core node properties, such as the request 711 described above with reference to FIG. 7. When the transformation node receives properties 831 from the core node, it may map those properties to the related fields of the transformation node 842. The properties may then be returned to the service layer 843 and passed on to the user interface 824. As previously described, an enhancement layer (not shown) may be used to augment or enhance requests sent to the transformation node 530. Pre- and post-exits as previously described may be performed during the operation of the services exposed by the transformation node.

In an embodiment, core nodes, transformation nodes, and their respective service providers within the service layer may be implemented separately. Such separation may reduce or eliminate the potential negative impact of the redundancy introduced by use of a transformation node.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A computer-implemented method of, via a user interface layer, updating information displayed in a user interface, comprising:

receiving, by a computer processor, at a service layer that interfaces between a backend application layer and the user interface layer, a request for a service, the service layer including data objects each representing a core node or a transformation node, the each core node defining one service of a business object stored in a backend application, and the each transformation node defining a service that is mapped from one or more core nodes;

responsive to the request, identifying, by the computer processor, whether the request is directed to a core node or to a transformation node, if the request is directed to the transformation node, identifying, by the computer processor, core nodes in the service layer that are associated with the transformation node;

requesting, by the computer processor, data representing the services defined by the core nodes that are associated with the transformation node;

responsive to receiving the data representing services from the core nodes associated with the transformation node, mapping, by the computer processor, the services of the core nodes to the service of the transformation node;

performing, by the computer processor, an exit operation to modify data of the transformation node to be sent to the user interface;

sending, by the computer processor, the modified data of the transformation node to the user interface; and updating, by the computer processor, user interface element(s) associated with the transformation node to display the modified data;

if the request is directed to the core node, requesting, by the computer processor, the service defined in the core node;

responsive to receiving the service from the core node, sending, by the computer processor, data representing the service of the core node to the user interface; and updating, by the computer processor, user interface element(s) associated with the core node to display the data representing the service of the core node.

2. The method of claim 1, wherein the exit operation is a pre-exit operation performed prior to receiving the data representing the services from the core node.

3. The method of claim 1, wherein the exit operation is a post-exit operation performed after receiving the data representing the services from the core node.

4. The method of claim 1, wherein the transformation node is a redirect of the core nodes.

5. A system for accessing a business management system, comprising:

a database configured with a backend application layer and stored therein business objects;

a display device configured with a user interface layer that includes a model-driven user interface to construct user interface elements; and a processor configured to support a service layer that interfaces between the backend application layer and the user interface layer, the service layer including data objects of:

a plurality of core nodes, each core node defining a service of a business object;

a transformation node derived from a subset of the plurality of core nodes; and an enhancement layer of the transformation node to provide data from the transformation node to associated elements of the model-driven user interface, wherein:

upon receiving a request for a service from the model-driven user interface, the processor identifies whether the service request is directed to a core node or a transformation node;

if the request is directed to the core node, the processor performs:

receiving from the core node data representing the service defined by the core node; and transmitting the data of the core node to the model-driven user interface for displaying at the user interface; and if the request is directed to the transformation node, the computer processor performs:

requesting data representing services defined by the subset of the plurality of core nodes associated with the transformation node;

responsive to receiving the data representing services defined by the subset of core nodes associated with the transformation node, mapping the services of the subset of core nodes to the service of the transformation node;

executing an exit operation to modify data of the transformation node to be sent to the user interface; and transmitting the modified data of the transformation node to the user interface for displaying the data at the user interface.

6. The system of claim 5 wherein the transformation node includes data stored in a second core node.

7. The system of claim 5 wherein the transformation node includes a service exposed by a second core node.

8. A machine-readable hardware storage medium having stored thereon executable program instructions for execution on at least one processor, which when executed by the processor cause the processor to perform:

receiving at a service layer that interfaces between a backend application layer and the user interface layer, a first request for a service, the service layer including data objects each representing a core node or a transformation node, the each core node defining one service of a business object stored in a backend application, and each transformation node defining a service that is mapped from one or more core nodes;

responsive to receiving the first request, sending the first request to a transformation node;

selecting core node(s) associated with the transformation node;

defining a second request based on the first request and the selected core node(s);

performing an exit operation defined in an enhancement layer of the transformation node to modify the second request;

sending the second request to the selected core node(s);

executing the second request with respect to each of the selected core node(s); and updating a user interface supported by the user interface layer to reflect changes resulting from execution of the second request.

9. The machine-readable hardware storage medium of claim 8, wherein the exit request is a pre-exit operation.

10. The machine-readable hardware storage medium of claim 8, wherein the exit request is a post-exit operation.

11. A computer-readable hardware storage medium having stored thereupon a data object representing a service layer that, when executing a user interface application, interfaces between a backend application layer and a user interface layer for displaying information of a business object stored in a backend application, the service layer comprising:

data objects representing core nodes, each core node defining a service of the business object; and data objects representing transformation nodes, each transformation node defining a service that is derived from one or more core nodes, wherein:

when receiving a request for a service from the user interface, a computer processor identifies whether the service request is directed to a core node or a transformation node;

if the request is directed to the core node, the computer processor performs:

receiving from the core node the data object representing the service defined on the core node; and transmitting the data object representing the service of the core node to the user interface for displaying at the user interface; and if the request is directed to the transformation node, the computer processor performs:

requesting data objects representing services from core nodes associated with the transformation node;

responsive to receiving the data objects representing the services from the core nodes associated with the transformation node, mapping the services from the core nodes to the service of the transformation node;

executing an exit operation to modify data of the transformation node to be sent to the user interface; and transmitting the modified data of the transformation node to the user interface for displaying the modified data at the user interface.

* * * * *